D. D. ROBINSON.
Whiffletree Hook.
No. 73,047.  Patented Jan. 7, 1868.
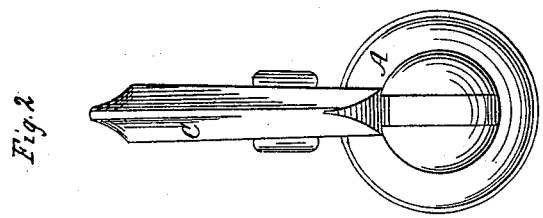
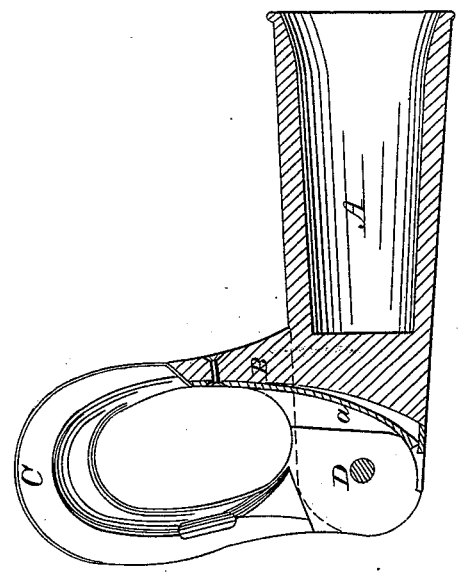

United States Patent Office.

D. D. ROBINSON, OF NILES, MICHIGAN.

Letters Patent No. 73,047, dated January 7, 1868.

IMPROVEMENT IN HOOK FOR WHIFFLE-TREES.

*The Schedule referred to in these Letters Patent and making part of the same.*

TO ALL WHOM IT MAY CONCERN:

Be it known that I, D. D. ROBINSON, of Niles, in the county of Berrien, and State of Michigan, have invented a new and improved Hook for Whiffle-Trees; and I do hereby declare that the following is a full, clear, and exact description thereof, reference being had to the accompanying drawings, forming part of this specification.

This invention consists in the employment of a spring, in combination with the hook for a whiffle-tree, as an improved article of manufacture.

To enable others skilled in the art to make and use my invention, I will proceed to describe its construction and operation.

Figure 1 is a sectional view of my improved hook for whiffle-trees from the line $x\ x$.

Figure 2 is an end elevation of the same.

Letters of like name and kind refer to like parts in each of the figures.

A represents a socket, made of malleable iron, brass, or other suitable material, in such a manner as to fit on the end of a whiffle-tree. Upon the end of the socket is provided a lug or projection, B, that forms a portion of the loop of the hook when closed. At the outer end of the socket is a slot or groove in which is pivoted the hook C by the pin or pivot-bolt D. The said hook C is made so as to connect closely to the lug or projection B, in such a manner as to form a perfect loop, which prevents the cock-eye of the trace from being disengaged. $a$ is a spring, made of steel, with one end secured to the lug or projection B, while the other end extends downward and acts against the lower end of the hook C, in such a manner as to keep the hook closely connected to the projection B. Other forms of springs may be used for the same purpose.

The advantages of my invention will be readily seen from the easy manner by which it is operated, especially when, in mud times, the hook is covered with mud and frozen, a slight pull upon the trace will break the mud or dirt and open the hook, when it is readily disengaged. It is also reliable and safe, as it never drops a trace, the hook being held in position by the spring. It is durable, for the reason that the hook is made separately, and when worn can be readily removed and a new one substituted in its place. The hook will wear much longer, as also the cock-eye, for the reason that while drawing, the hook works upon the pivot, so that a steady bearing is formed between the cock-eye and hook.

Having thus described my invention, what I claim as new, and desire to secure by Letters Patent, is—

The hook C, pivoted in the groove at the outer end of the socket A, connecting closely to the projection B, forming a perfect loop, and held in place by the spring $a$, when all are constructed and arranged as herein set forth.

D. D. ROBINSON.

Witnesses:
EDWARD BACON,
JAMES H. FAIRCHILD.